United States Patent
Isozaki

(10) Patent No.: US 11,588,888 B2
(45) Date of Patent: Feb. 21, 2023

(54) METHOD OF CONTROLLING COMMUNICATION AND COMMUNICATION CONTROL DEVICE IN WHICH A METHOD FOR TRANSMITTING DATA IS SWITCHED

(71) Applicant: YAMAHA CORPORATION, Hamamatsu (JP)

(72) Inventor: Yoshimasa Isozaki, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 9 days.

(21) Appl. No.: 17/396,880

(22) Filed: Aug. 9, 2021

(65) Prior Publication Data
US 2022/0070254 A1    Mar. 3, 2022

(30) Foreign Application Priority Data
Sep. 1, 2020 (JP) .............................. JP2020-146821

(51) Int. Cl.
*G06F 15/173* (2006.01)
*H04L 67/1074* (2022.01)
(Continued)

(52) U.S. Cl.
CPC ........ *H04L 67/1074* (2013.01); *G06K 9/6282* (2013.01); *H04L 5/0048* (2013.01); *H04L 65/65* (2022.05)

(58) Field of Classification Search
CPC ... H04L 67/1074; H04L 65/65; H04L 5/0048; G06K 9/6282
(Continued)

(56) References Cited

U.S. PATENT DOCUMENTS 6,653,545 B2 * 11/2003 Redmann .............. G10H 1/0058
                                                 84/622
6,974,901 B2 * 12/2005 Puryear ................ G10H 1/0066
                                                 84/622
(Continued)

FOREIGN PATENT DOCUMENTS

JP        2005195982 A      7/2005
WO     WO-2015168823 A1 * 11/2015 .............. H04L 29/06

OTHER PUBLICATIONS

Cáceres, J. et al., "Jacktrip: Under the Hood of an Engine for Network Audio," 2010, Journal of New Music Research, vol. 39, No. 3, pp. 1-4. (Year: 2010).*

(Continued)

*Primary Examiner* — Alicia Baturay
(74) *Attorney, Agent, or Firm* — Rossi, Kimms & McDowell LLP

(57) ABSTRACT

A method of controlling communication includes obtaining a result of comparison between a first feature value of first streaming data and a second feature value of second streaming data and transmitting a first switching signal to a first terminal and a second terminal in the case where the first feature value and the second feature value have a first relation according to the comparison result. The first feature value is of a first streaming data transmitted from the first terminal using the first communication method type. The second feature value is of a second streaming data transmitted from the second terminal using the first communication method type. The first switching signal causes the first terminal and the second terminal to switch from using the first communication method type to using a second communication method type to transmit streaming data between the first terminal and the second terminal.

21 Claims, 7 Drawing Sheets

(51) Int. Cl.
   *H04L 5/00* (2006.01)
   *G06K 9/62* (2022.01)
   *H04L 65/65* (2022.01)
(58) Field of Classification Search
   USPC .......................................................... 709/224
   See application file for complete search history.

(56) References Cited

U.S. PATENT DOCUMENTS

| | | | | |
|---|---|---|---|---|
| 7,129,408 | B2* | 10/2006 | Uehara | G10H 1/0066 84/645 |
| 7,297,858 | B2* | 11/2007 | Paepcke | G10H 1/0066 84/645 |
| 7,511,215 | B2* | 3/2009 | Bicker | H04L 65/4038 84/645 |
| 7,518,051 | B2* | 4/2009 | Redmann | G10H 1/0058 84/601 |
| 7,593,354 | B2* | 9/2009 | Surin | H04L 47/22 370/266 |
| 7,853,342 | B2* | 12/2010 | Redmann | G10H 7/00 700/94 |
| 7,996,550 | B2* | 8/2011 | Fischer | H04L 67/104 725/81 |
| 8,078,729 | B2* | 12/2011 | Kozat | H04L 65/612 707/967 |
| 8,180,063 | B2* | 5/2012 | Henderson | G10H 1/0066 381/62 |
| 8,301,790 | B2* | 10/2012 | Morrison | G10H 1/0058 709/248 |
| 8,447,875 | B2* | 5/2013 | Liu | H04L 65/80 370/312 |
| 8,688,852 | B2* | 4/2014 | Guo | H04N 7/17318 709/231 |
| 8,838,823 | B2* | 9/2014 | Guo | H04L 67/1076 709/205 |
| 8,856,373 | B2* | 10/2014 | Guo | H04L 47/805 725/105 |
| 8,918,541 | B2* | 12/2014 | Morrison | G10H 1/0058 709/248 |
| 8,983,829 | B2* | 3/2015 | Cook | G10L 13/0335 84/610 |
| 9,661,043 | B2* | 5/2017 | Walker | H04L 67/1097 |
| 9,721,579 | B2* | 8/2017 | Cook | G10H 1/366 |
| 9,734,812 | B2* | 8/2017 | Katto | A63F 13/00 |
| 9,866,731 | B2* | 1/2018 | Godfrey | G10H 1/366 |
| 9,911,403 | B2* | 3/2018 | Sung | G11B 27/02 |
| 9,949,027 | B2* | 4/2018 | Amarilio | G06F 3/165 |
| 10,395,666 | B2* | 8/2019 | Cook | G10L 13/0335 |
| 10,419,852 | B2* | 9/2019 | Amarilio | H03G 3/341 |
| 10,424,283 | B2* | 9/2019 | Sung | G11B 27/28 |
| 10,437,552 | B2* | 10/2019 | Amarilio | G06F 3/165 |
| 10,567,788 | B2* | 2/2020 | Kopietz | E05B 83/24 |
| 10,587,780 | B2* | 3/2020 | Godfrey | H04N 5/04 |
| 10,627,782 | B2* | 4/2020 | Oda | G06F 17/11 |
| 10,701,388 | B2* | 6/2020 | Kopietz | G06T 15/005 |
| 10,778,323 | B2* | 9/2020 | Babich | H04B 7/18504 |
| 10,911,501 | B2* | 2/2021 | Rofe | H04L 65/765 |
| 10,929,092 | B1* | 2/2021 | Karroll, Jr. | G10H 1/0058 |
| 10,944,669 | B1* | 3/2021 | Ramanathan | H04W 40/24 |
| 10,951,890 | B1* | 3/2021 | Dickson | H04L 67/104 |
| 11,074,923 | B2* | 7/2021 | Cook | G10L 13/0335 |
| 11,158,296 | B2* | 10/2021 | Sung | G11B 27/28 |
| 11,196,808 | B2* | 12/2021 | Weinberger | H04L 43/06 |
| 11,321,931 | B2* | 5/2022 | Parr | A63F 13/655 |
| 11,323,496 | B2* | 5/2022 | Weinberger | H04L 67/10 |
| 11,329,363 | B1* | 5/2022 | Neenan | H01Q 21/28 |
| 11,381,835 | B2* | 7/2022 | Kopietz | E05B 85/26 |
| 11,394,855 | B2* | 7/2022 | Godfrey | H04N 5/04 |
| 11,461,070 | B2* | 10/2022 | Einziger | H04L 65/70 |
| 2009/0234967 | A1* | 9/2009 | Yu | H04L 67/06 709/232 |
| 2012/0050456 | A1* | 3/2012 | Arnao | H04N 7/152 348/E7.083 |
| 2015/0254056 | A1* | 9/2015 | Walker | H04L 43/087 715/716 |
| 2015/0254340 | A1* | 9/2015 | Walker | H04L 43/087 709/219 |
| 2015/0256473 | A1* | 9/2015 | Walker | H04L 67/142 370/253 |
| 2015/0256587 | A1* | 9/2015 | Walker | H04L 65/611 709/203 |
| 2015/0256598 | A1* | 9/2015 | Walker | H04L 43/087 709/217 |
| 2015/0256613 | A1* | 9/2015 | Walker | H04L 43/10 709/217 |
| 2016/0140950 | A1* | 5/2016 | Abel | G10K 15/08 381/63 |
| 2021/0409138 | A1* | 12/2021 | Galuten | G10H 1/0033 |
| 2022/0014570 | A1* | 1/2022 | Goldstein | H04L 65/611 |
| 2022/0070254 | A1* | 3/2022 | Isozaki | H04L 65/752 |
| 2022/0188061 | A1* | 6/2022 | Williams | G06F 3/16 |

OTHER PUBLICATIONS

Dickson, C., "The Technology Behind a Low Latency Cloud Gaming Service," https://parsec.app/blog/description-of-parsec-technology-b2738dcc3842 (retrieved Oct. 11, 2022), pp. 1-11. (Year: 2022).*

Drioli, C. et al.; "Networked Performances and Natural Interaction via LOLA: Low Latency High Quality A/V Streaming System;" Apr. 8-10, 2013; the Second International Conference on Information Technologies for Performing Arts, Media Access and Entertainment, ECLAP 2013; pp. 240-250. (Year: 2013).*

Howell, I. et al., "A Real Time, Distributed Performance Class Using Soundjack and Zoom," https://www.ianhowellcountertenor.com/distributed-performance-class (retrieved Oct. 11, 2022), pp. 1-29. (Year: 2022).*

"Parsec for Teams," https://pages.parsec.app/hubfs/AWS%20AMI%20marketplace/Parsec%20for%20Teams%20Onboarding%20Guide.pdf (retrieved Oct. 11, 2022), pp. 1-20. (Year: 2022).*

* cited by examiner

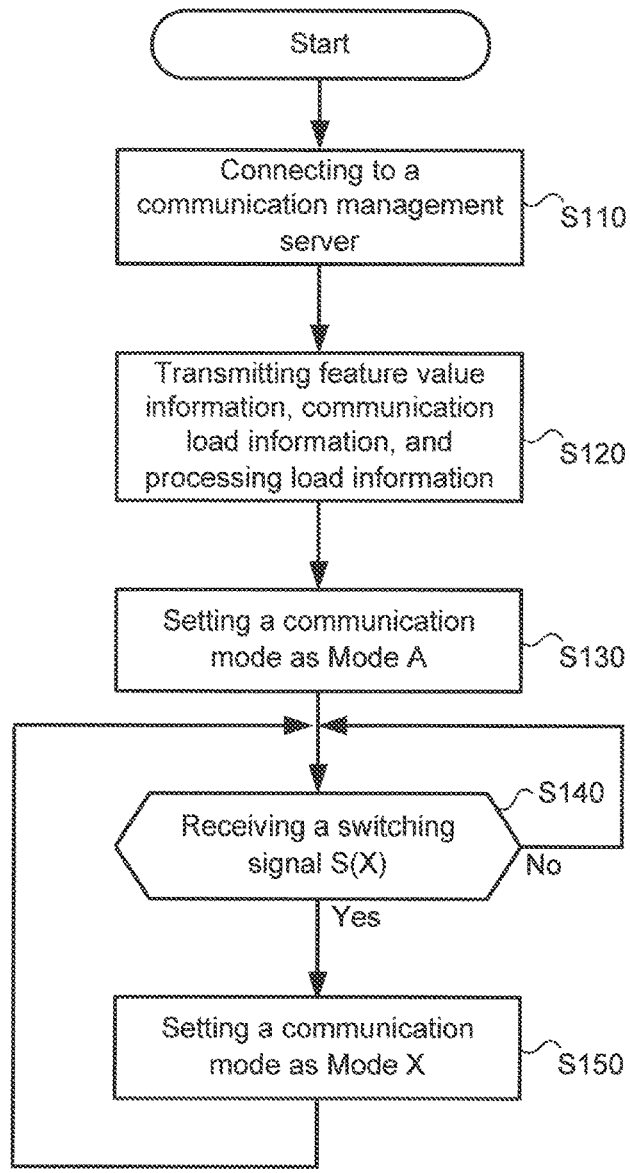

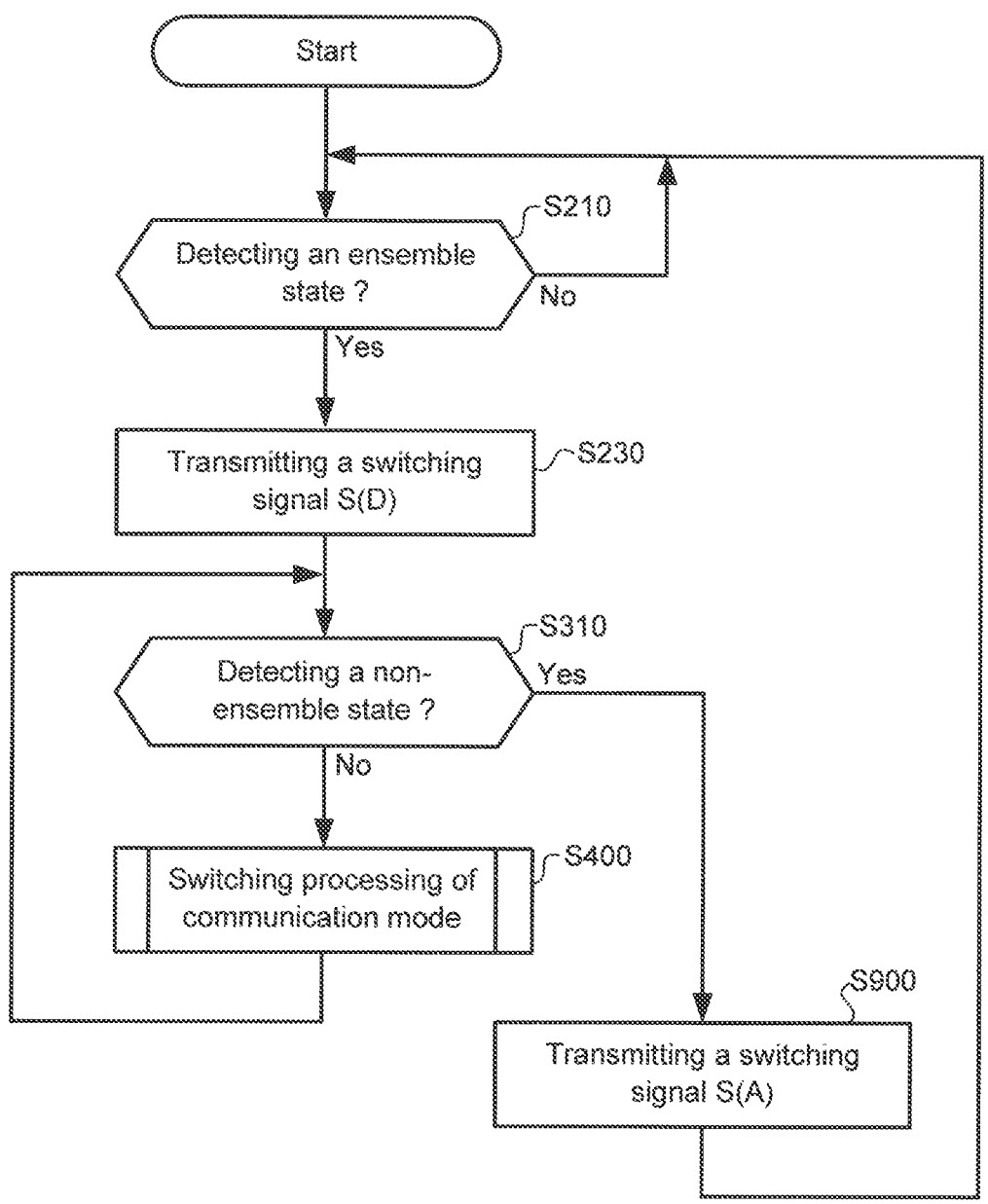

METHOD OF CONTROLLING COMMUNICATION AND COMMUNICATION CONTROL DEVICE IN WHICH A METHOD FOR TRANSMITTING DATA IS SWITCHED

CROSS-REFERENCE TO RELATED APPLICATIONS

This application is based upon and claims the benefit of priority from the prior Japanese Patent Application No. 2020-146821, filed on Sep. 1, 2020, the entire contents of which are incorporated herein by reference.

FIELD

The present disclosure relates to a technique for controlling communications.

BACKGROUND

A technique have been developed in which a plurality of communication bases at which musical instruments are played is connected via a network, thereby enabling an ensemble even at a remote place. Communication delay caused by network connection makes it difficult to ensemble. Therefore, it is desirable to construct an environment in which the communication delay is reduced, but the communication delay cannot be eliminated. Therefore, a technique for reducing the influence of delay on the premise that communication delay is present is disclosed in, for example, Japanese laid-open patent publication No. 2005-195982.

SUMMARY

A method of controlling communication according to an embodiment includes obtaining a result of comparison between a first feature value and a second feature value and transmitting a first switching signal to a first terminal and a second terminal in the case where the first feature value and the second feature value have a first relation according to the comparison result. The first feature value is of a first streaming data transmitted from the first terminal using a first communication method type. The second feature value is of a second streaming data transmitted from the second terminal using the first communication method type. The first switching signal causes the first terminal and the second terminal to switch from using the first communication method type to using a second communication method type to transmit streaming data between the first terminal and the second terminal. The second communication method type is different from the first communication method type.

BRIEF DESCRIPTION OF THE DRAWINGS

FIG. 2 is a diagram for explaining a communication control table according to an embodiment;

FIG. 3 is a flowchart for explaining a method of switching communication of a communication terminal according to an embodiment;

FIG. 4 is a flowchart for explaining a method of controlling communication of a control server according to an embodiment;

DESCRIPTION OF EMBODIMENTS

Figure 1:
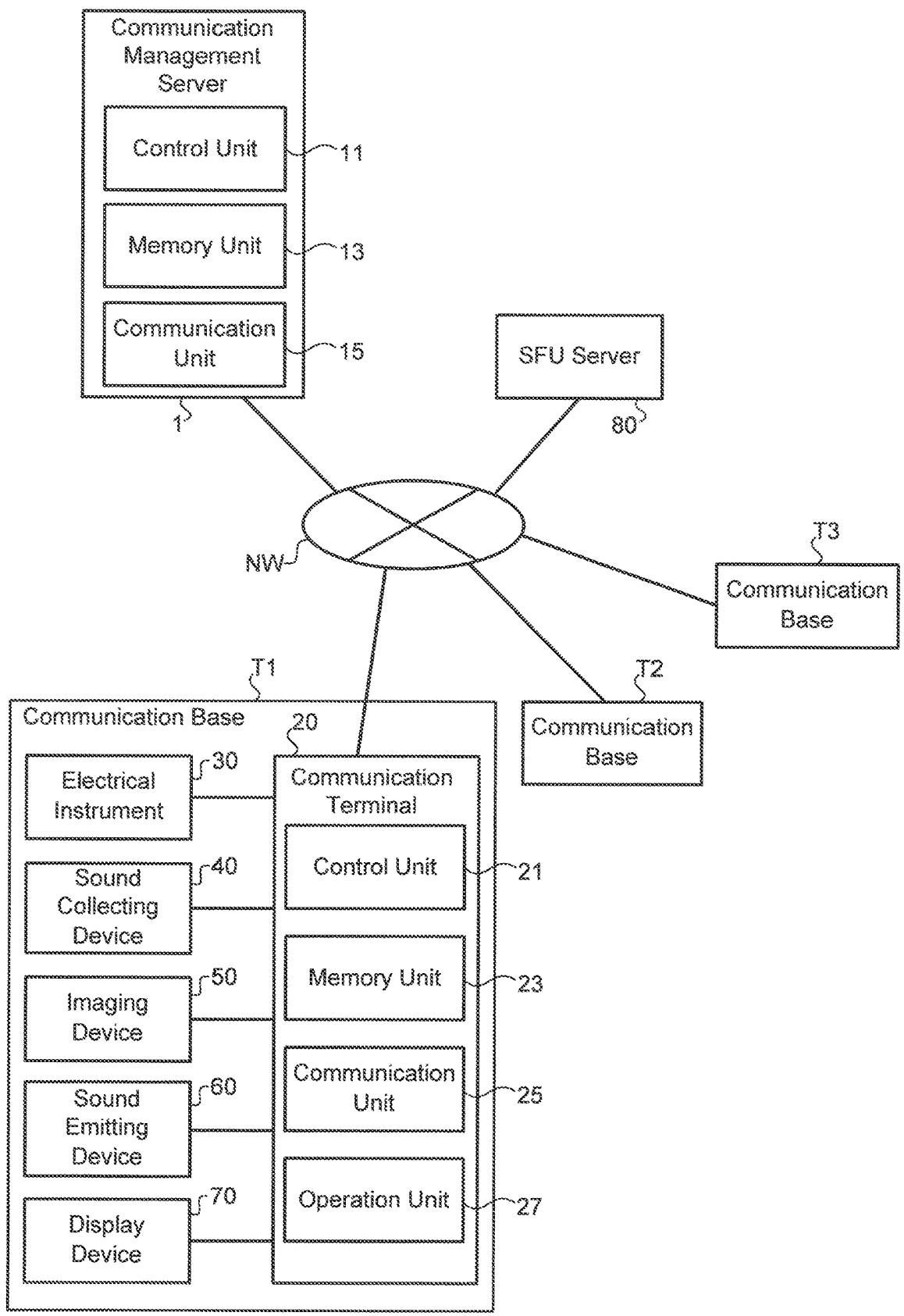
FIG. 1 is a diagram for explaining a configuration of a communication system according to an embodiment.

Hereinafter, a communication system according to an embodiment of the present disclosure will be described in detail with reference to the drawings. The following embodiments are examples of embodiments of the present disclosure, and the present disclosure is not to be construed as being limited to these embodiments. In the drawings referred to in the present embodiments, the same portions or portions having similar functions are denoted by the identical symbols or similar symbols (symbols each formed simply by adding A, B, etc. to the end of a number), and a repetitive description thereof may be omitted.

A method of communicating between a plurality of communication bases (between a plurality of communication terminals) in real time include, for example, Peer to Peer communication (hereinafter referred to as P2P communication) and client-server communication. The P2P communication is a communication method type in which communication terminals at the respective communication bases are connected equally. The client-server communication is a communication method type in which communication terminals at the respective communication bases are connected through a server. Due to the difference in the communication method type, in the P2P communication, the communication delay can be reduced, but processing load and communication traffic of the communication terminal can be easily increased. On the other hand, in the client-server communication, load on the communication terminal and the communication traffic can be reduced, but the communication delay increases. Such servers have, for example, functions of SFU (Selective Forwarding Unit) and MCU (Multipoint Control Unit).

In the above-described ensemble, it is necessary to make the communication delay exceedingly small. Therefore, it is desirable to use the P2P communication as the communication method type when playing an ensemble. However, if the processing load in communication terminal increases, the processing load may result in a greater delay or affect other processing in the communication terminal. On the other hand, depending on the status of respective communication bases, the P2P communication may not necessarily be used.

An object of the present disclosure is to switch communication method types depending on a status between the plurality of communication bases.

[1. Configuration of Communication System]

FIG. 1 is a diagram for explaining a configuration of a communication system according to an embodiment. The communication system includes a communication management server 1 connected to a network NW, such as the Internet. The communication management server 1 is an example of a communication control device. The communication management server 1 controls communication between the plurality of communication bases connected to the network NW depending on the status of the communication bases. Functions of the communication management server 1 described later may be implemented in collaboration by a plurality of servers. In this example, two communication method types are used for the communication between the communication bases. The two communication method types are the P2P communication and the client-server communication. In FIG. 1, three communication bases T1, T2, and T3 are exemplified, but the number is not limited to this. In the case where the communication bases T1, T2, and T3 are described without being distinguished from each other, they are simply referred to as a communication base or communication bases. An SFU server 80 is used in the client-server communication and is a server that mediates respective communication bases.

A communication terminal 20 is arranged at each communication base. An electrical instrument 30, a sound collecting device 40, an imaging device 50, a sound emitting device 60, and a display device 70 are connected to the communication terminal 20. Although the communication terminal 20 is always present at each communication base, at least one of the electrical instrument 30, the sound collecting device 40, the imaging device 50, the sound emitting device 60, and the display device 70 may not be connected to the communication terminal 20. At least one of the electrical instrument 30, the sound collecting device 40, the imaging device 50, the sound emitting device 60, and the display device 70 and the communication terminal 20 may be configured as an integral device.

The electrical instrument 30 includes a performance operating element, a sound source for outputting sound data Da in response to an operation to the performance operating element, and a data output unit for outputting sound control data Dc corresponding to the operation. The electrical instrument 30 is, in this example, an electronic piano having a key as the performance operating element. The sound data Da and the sound control data Dc are output to the communication terminal 20. The sound data Da is data indicating a sound wave signal and may be output to the sound emitting device 60. The sound control data Dc is, for example, data for controlling the sound source in accordance with a predetermined standard such as MIDI standard. In this case, the sound control data Dc includes information defining a sound generation content, such as information relating to a sound generation start timing (note on) and information relating to a sound generation end timing (note off).

The sound source can also output the sound data Da under the control of the sound control data Dc. The electrical instrument 30 may include a driving unit, such as a solenoid, that drives the performance operating element in response to the externally input sound control data Dc. When the sound control data Dc is received from another communication base, the sound control data Dc may be supplied to such a sound source or driving unit. Since this situation is the same as the situation in which a performance using the electrical instrument 30 is played by driving the performance operating element, the sound data Da corresponding to the sound control data Dc is generated.

The sound collecting device 40 has, for example, a microphone or an input terminal of a sound wave signal, and outputs the sound input to the microphone or the sound wave signal input to the input terminal as the sound data Da to the communication terminal 20.

The imaging device 50 has, for example, a camera, and outputs video data Dv corresponding to an image captured by the camera to the communication terminal 20. In the following description, an image includes both a still image and a moving image.

The sound emitting device 60 has, for example, a speaker, and outputs sounds indicated by the sound data Da supplied from the communication terminal 20 from the speaker. The sound data Da supplied to the sound emitting device 60 is the sound data Da transmitted from another communication base but may include the sound data Da generated at its own communication base.

The display device 70 has, for example, a liquid crystal display, and displays an image indicated by the video data Dv supplied from the communication terminal 20 on the liquid crystal display. The video data Dv supplied to the display device 70 is the video data Dv transmitted from another communication base but may include the video data Dv generated at its own communication base.

[2. Configuration of Communication Terminal]

The communication terminal 20 includes a control unit 21, a memory unit 23, a communication unit 25, and an operation unit 27. The control unit 21 includes a CPU (processor), RAM, ROM, and the like. The control unit 21 executes a program stored in the memory unit 23 using the CPU and performs a processing in accordance with an instruction defined in the program. In this example, a program for performing a processing for implementing a method of switching communication (communication switching method) is stored in the memory unit 23. The communication switching method includes a processing for switching the communication method type for transmitting data based on an instruction from the communication management server 1.

The communication unit 25 includes a communication module and connects to the network NW to transmit/receive various types of data to/from external devices such as the communication management server 1, the communication terminal 20 at other communication bases and the SFU server 80. Data transmitted between the communication unit 25 (the communication terminal 20) and an external device other than the communication management server 1 includes the sound control data Dc, the sound data Da, and the video data Dv, and is transmitted as streaming data. The communication method type for transmitting these data is set by the control of the control unit 21. As described above, the communication method type includes, in this example, the P2P communication and the client-server communication.

The operation unit 27 includes operation devices such as a mouse and a keyboard, accepts user's operations on the operation devices, and outputs signals corresponding to the operations to the control unit 21.

The memory unit 23 includes a memory device such as non-volatile memory, and stores a program to be executed by the control unit 21. In addition, various types of data to be used in the communication terminal 20 are stored in the memory unit 23. The data stored in the memory unit 23 includes a communication control table. The program may be executable by a computer and provided to the communication terminal 20 in a state of being stored in a computer-readable recording medium such as a magnetic recording medium, an optical recording medium, a magneto-optical recording medium, or a solid-state memory. In this case, the communication terminal 20 may be provided with a device for reading the recording medium. The program may also be downloaded via the communication unit 25 to be provided to the communication terminal 20.

FIG. 2 is a diagram for explaining the communication control table according to an embodiment. The communication control table defines the communication method type to be used for transmission of the sound control data Dc, the sound data Da, and the video data Dv in respective communication modes. The plurality of communication modes includes modes A, B, C, and D. The communication method type includes the client-server communication (SFU) and the P2P communication (P2P).

In the mode A, all data is transmitted in the client-server communication (SFU). In the mode D, all data is transmitted in the P2P communication (P2P). Meanwhile, in the mode B, the sound control data Dc is transmitted in the P2P communication (P2P), and the sound data Da and the video data Dv are transmitted in the client-server communication (SFU). In mode C, the sound control data Dc and the sound data Da are transmitted in the P2P communication (P2P), and the video data Dv is transmitted in the client-server communication (SFU).

When the communication terminal 20 is instructed to set the communication mode from the communication management server 1, the control unit 21 refers to the communication control table to determine the communication method type for transmitting each data corresponding to the communication mode. In this way, the control unit 21 sets the communication method type corresponding to the instructed communication mode in the communication unit 25. The setting of the communication mode by the communication management server 1 will be described later.

[3. Method of Switching Communication]

Next, a method of switching communication in the communication terminal 20 will be described. As described above, each processing in the method of switching communication is executed by the control unit 21. The processing of the method of switching communication described below is started, for example, by a user's instruction input to the operation unit 27.

FIG. 3 is a flowchart for explaining a method of switching communication of a communication terminal according to an embodiment. The communication terminal 20 is connected to the communication management server 1 (step S110). At this time, the communication terminal 20 specifies a session room for the communication base to be connected to participate. A new session room may also be established in the communication management server 1. The communication terminals 20 in the plurality of communication bases participating in this session room are the terminals to transmit data to each other.

The communication terminal 20 starts to transmit feature value information, communication load information, and processing load information to the communication management server 1 (step S120). The communication terminal 20 transmits the feature value information, the communication load information, and the processing load information to the communication management server 1 every predetermined time interval (e.g., every 100 milliseconds) during the period connected to the communication management server 1.

The feature value information includes feature values of the sound control data Dc and the sound data Da being transmitted as the streaming data. In this example, the feature value is information indicating whether a sound is generated at the time point of transmission. Therefore, the feature value information related to the sound data Da indicates a sound period of the sound data Da by indicating that the sound is generated during the period in which the sound volume level obtained from the sound data Da exceeds the predetermined value, and the sound is not generated during the other periods. The feature value information related to the sound control data Dc indicates the sound period of the sound control data Dc by indicating that the sound is generated during the period from the note on to note off indicated by the sound control data Dc, and the sound is not generated during the other periods. The feature value information related to the sound control data Dc may indicate that the sound is generated when the sound volume level obtained from the sound data Da exceeds the predetermined value after the sound control data Dc is converted into the sound data Da by the sound source.

The communication load information is information indicating load on a communication line used when the communication terminal 20 transmits data. The communication load is obtained, for example, by measuring round-trip delay time interval (Round Trip Time) in the P2P communication between the communication terminal 20 and the other communication terminal 20. Generally, the P2P communication increases the communication load because the data traffic to be transmitted/received increases compared with the client-server communication. Therefore, if there is no allowance in the communication line, it is not possible to realize a low delay even in the P2P communication.

The processing load information is information indicating the processing load in the communication terminal 20. The processing load corresponds to, for example, load of the CPU. Since, generally, the P2P communication increases the data traffic to be transmitted/received than the client-server communication, the processing load increases due to encoding, decoding, and the like. Therefore, if there is no allowance in the data-processing capacity of the communication terminal 20, it is not possible to realize a low delay even in the P2P communication. The processing load may also include those caused by other programs executed in parallel in the communication terminal 20.

When the communication terminal 20 is connected to the communication management server 1, the communication terminal 20 receives a communication mode setting instruction from the communication management server 1 and sets the communication mode (step S130). The communication mode specified by the communication management server 1 is the communication mode set for the session room specified by the communication terminal 20. If no communication mode is set for this session room, such as when a new session room is established, the communication management server 1 receives an instruction to set the communication mode as the mode A. In the case of an already established session room, another communication mode (mode B, mode C, or mode D) may be set by a communication control method to be described later.

The communication terminal 20 refers to the communication control table and transmits each data depending on the set communication mode. Subsequently, the communication terminal 20 waits until it receives a switching signal S(X) from the communication management server 1 (step S140, No). X represents any one of A, B, C, and D. A, B, C, and D correspond to the mode A, mode B, mode C, and mode D, respectively. When the switching signal S(X) is received (step S140; Yes), the communication terminal 20 switches the communication mode by setting the communication mode as the mode X corresponding to the switching signal S(X) (step S150). The communication terminal 20 waits until it receives the switching signal S(X) (step S140; No).

The communication terminal 20 is controlled by the communication management server 1 to change the communication method type used for transmitting the sound control data Dc, the sound data Da, and the video data Dv.

[4. Configuration of Communication Management Server]

As shown in FIG. 1, the communication management server 1 includes a control unit 11, a memory unit 13, and a communication unit 15. The control unit 11 includes a CPU (processor), RAM, ROM, and the like. The control unit 11 executes a program stored in the memory unit 13 by the CPU and performs a processing in accordance with an instruction defined in the program. The program includes a program for performing a processing for implementing a method of controlling communication of the communication terminal 20 (the method of controlling communication). The communication control method includes a processing for instructing the communication terminal 20 to switch the communication method type for transmitting data. Details of this processing will be described later. The communication unit 15 includes a communication module and connected to the network NW to transmit various types of data to the communication terminal 20 at each communication base.

The memory unit 13 includes a memory device, such as a hard disk, and stores a program executed by the control unit 11. In addition, various types of data used in the communication management server 1 are stored. The program may be executable by a computer and provided to the communication management server 1 in a state of being stored in a computer-readable recording medium such as a magnetic recording medium, an optical recording medium, a magneto-optical recording medium, or a solid-state memory. In this case, the communication management server 1 may be provided with a device for reading the recording medium. The program may also be provided by downloading via the communication unit 15.

[5. Method of Controlling Communication]

Next, a method of controlling communication in the communication management server 1 will be described. As described above, each processing in the communication control method is executed by the control unit 11. A processing of the communication control method described below is started, for example, when the plurality of communication bases participates in the session room. At this time, the communication mode is set as the mode A. Therefore, the transmission of the sound control data Dc, the sound data Da, and the video data Dv between respective communication bases is all set as the client-server communication.

FIG. 4 is a flowchart for explaining a method of controlling communication of the management server according to an embodiment. The communication management server 1 compares the feature value information received from the communication terminal 20 at the plurality of communication bases and waits until an ensemble state is detected (step S210; No).

The ensemble state refers to a state in which a performance is played at the plurality of communication bases. The performance at each communication base is, for example, a performance using the electrical instrument 30 or a performance using an acoustic musical instrument. When the performance is played using the electrical instrument 30, at least one of the sound control data Dc and the sound data Da is supplied to the communication terminal 20. When the performance is played using an acoustic musical instrument, sound generation of the acoustic musical instrument is input to the sound collecting device 40, and the sound data Da is supplied to the communication terminal 20.

As described above, the feature value information transmitted from the communication terminal 20 at each communication base includes information indicating whether the sound control data Dc and the sound data Da transmitted as the streaming data are sounded at each time point. Therefore, by comparing the feature value information along the time axis, it is possible to detect whether sounds are simultaneously generated at the plurality of communication bases. However, even if it can be detected that a sound has been generated by the feature value information, there is a possibility that the sound is not necessarily from the performance. In this example, a method of detecting the ensemble state is a method of excluding as much as possible the sound generation that is not from the performance.

Figure 5:
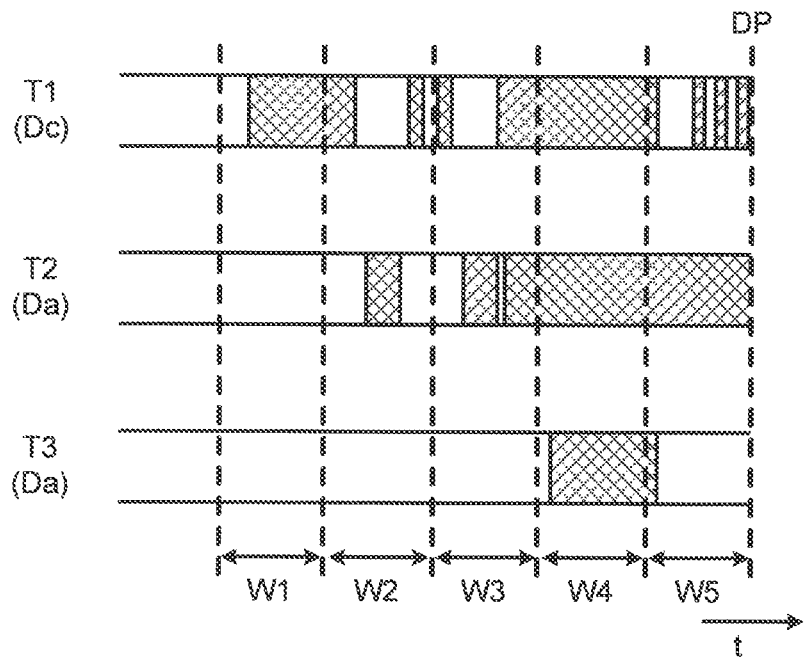
FIG. 5 is a diagram for explaining a method of detecting an ensemble state according to an embodiment.
Figure 6:
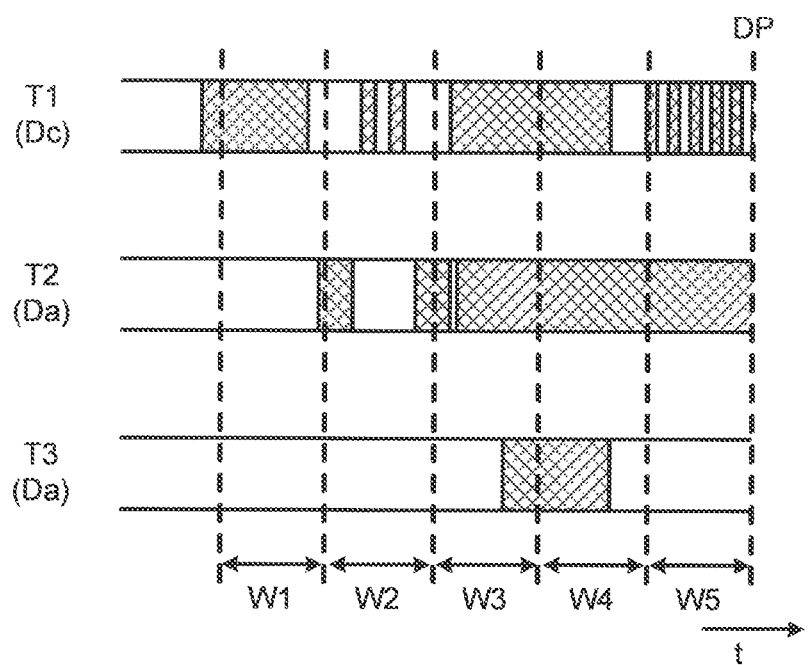
FIG. 6 is a diagram for explaining a method of detecting an ensemble state according to an embodiment.

FIG. 5 and FIG. 6 are diagrams for explaining a method of detecting the ensemble state according to an embodiment. In these diagrams, the sound periods (meshed portions in the figure) at the respective communication bases are shown along the time point t based on the feature value information transmitted from the communication terminal 20 at each of the communication bases T1, T2, and T3. The feature value indicates the sound generation of the sound control data Dc at the communication base T1 and indicates the sound generation of the sound data Da at the communication bases T2 and T3. FIG. 6 corresponds to a situation after a short time has elapsed from the situation of FIG. 5.

Specific examples of the method of detecting ensemble will be described. Five sections W1 to W5 are defined by dividing the period from 5 seconds before a determination point DP (current time point) of the ensemble detection to the determination point DP by every 1 second. The communication management server 1 determines whether there is a sound period in the plurality of communication bases in the respective sections (determination periods).

In an actual ensemble, the sound periods may not overlap, i.e., there may be no simultaneous sounds at the same time. Therefore, even if the sound periods at the plurality of communication bases do not overlap, if the sound period exists in one section, that section is determined as the section where the ensemble sound exists. The plurality of communication bases here may be different from all the communication bases participating in the session room, that is, it indicates at least two of the communication bases participating in the session room. The communication management server 1 detects that the session rooms in which these communication bases participate are in the ensemble state when it is determined that the ensemble sound exists in the sections W1 to W5.

The time interval retroactive from the determination point DP (the total time intervals of the sections W1 to W5), the number of divided sections, and the time of each section are examples, and may be set as various values. The length of each of the sections W1 to W5 may be different. In this case, the section distant from the determination point DP may be shorter, or the section closer to the determination point DP may be shorter. The sections W1 to W5 may not be arranged continuously. That is, adjacent sections may be temporally separated.

In FIG. 5, since a sound only exists at the communication base T1 in the section W1, it is determined that there is no ensemble sound in the section W1. On the other hand, it is determined that there is the ensemble sound in the sections W2 to W5. As described above, even in the section W2 in which the sound period of the communication base T1 and the sound period of the communication base T2 do not overlap, it is determined that there is the ensemble sound. At this point, since it is determined that there is no ensemble sound in the section W1, it is not detected that the session room in which the communication bases T1 to T3 participate is in the ensemble state.

In FIG. 6, it is determined that there is the ensemble sound in the sections W1 to W5. Therefore, the communication management server 1 detects that the session room in which the communication bases T1 to T3 participate is in the ensemble state. When the ensemble state is detected, even if the above condition is not satisfied, the session room is maintained as the ensemble state until a non-ensemble state, which will be described later, is detected.

Returning to FIG. 4, the description will be continued. When the ensemble state is detected (step S210, Yes), the communication management server 1 transmits a switching signal S(D) to the communication terminal 20 at respective communication bases (step S230). As described above, when the switching signal S(D) is received by the communication terminal 20, the communication mode is switched from the mode A to the mode D. That is, the transmission of the sound control data Dc, the sound data Da, and the video data Dv between the respective communication bases is all switched from the client-server communication to the P2P communication.

The communication management server 1 compares the feature value information received from the communication terminal 20 in the plurality of communication bases, and performs a switching processing of communication mode until the non-ensemble state is detected (step S310; No, step S400). The non-ensemble state refers to a state in which no performance is played at all communication bases or a state in which the performance is played at only one communication base.

Specific examples of the detection method of the non-ensemble state are opposite to the detection method of the ensemble state. That is, when it is determined that there is no ensemble sound in the sections W1 to W5 corresponding to the determination point DP, the non-ensemble state is detected.

When the non-ensemble state is detected (step S310; Yes), the communication management server 1 transmits a switching signal S(A) to the communication terminal 20 at respective communication bases (step S900). As described above, when the switching signal S(A) is received by the communication terminal 20, the communication mode is set as the mode A. That is, the transmission of the sound control data Dc, the sound data Da, and the video data Dv between the respective communication bases is all set as the client-server communication. The communication management server 1 waits until the ensemble state is detected (S210; No).

The switching processing of communication mode (step S400) is a processing for switching the communication mode depending on load value Ld. The load value Ld is an index of load magnitude calculated by the communication management server 1 based on the communication load information and the processing load information transmitted from respective communication terminals 20. In this example, the communication load and the processing load corresponding to the plurality of communication terminals 20 are set to 0% to 100%, respectively, and the largest value is set as the load value Ld.

Figure 7:
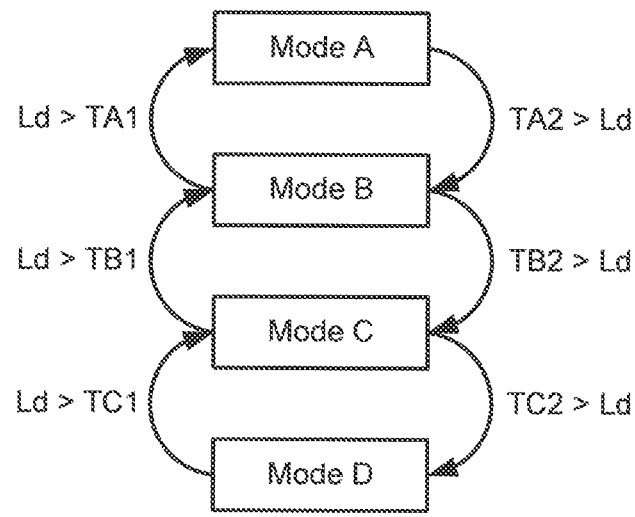
FIG. 7 is a diagram for explaining a method of controlling communication mode according to an embodiment.

FIG. 7 is a diagram for explaining a method of controlling communication mode according to an embodiment. FIG. 7 shows a condition when the communication mode is switched depending on the load value Ld in the switching processing of communication mode.

For example, if the load value Ld becomes larger than a threshold value TC1 when the communication mode is the mode D, the communication management server 1 transmits a switching signal S(C) to the communication terminal 20 to switch the communication mode to the mode C. If the load value Ld becomes larger than a threshold value TB1 when the communication mode is the mode C, the communication management server 1 transmits a switching signal S(B) to the communication terminal 20 to switch the communication mode to the mode B. On the other hand, if the load value Ld becomes smaller than a threshold value TC2 when the communication mode is the mode C, the communication management server 1 transmits the switching signal S(D) to the communication terminal 20 to switch the communication mode to the mode D.

The relation between TC1 and TC2 is TC1>TC2 in here. By doing like this, even if the Ld becomes smaller than the TC1 immediately after the Ld becomes larger than the TC1 and the communication mode is switched to mode C, the mode is not switched to the mode D immediately. The relations of the other thresholds are likewise TB1>TB2 and TA1>TA2. Load of the mode A is less than that of the mode B, load of the mode B is less than that of the mode C, and load of the mode C is less than that of the mode D. Thus, TA1, TB1 and TC1 may be set as the same thresholds. TA2, TB2 and TC2 may be set as the same thresholds.

As described above, in the switching processing of communication mode (step S400), the communication management server 1 changes the communication mode to the mode in which the load becomes lighter than the current mode when the load value Ld becomes large and changes the communication mode to the mode in which the communication delay becomes smaller than the current mode when the load value Ld becomes small. The switching processing of communication mode is continued until the above-described non-ensemble state is detected.

[6. Example of Data Transmission/Reception]

Next, an example of a communication method type applied to the transmission of the sound control data Dc, the sound data Da, and the video data Dv between the respective communication bases by the method of controlling communication and the method of switching communication as described above will be described.

Figure 8:
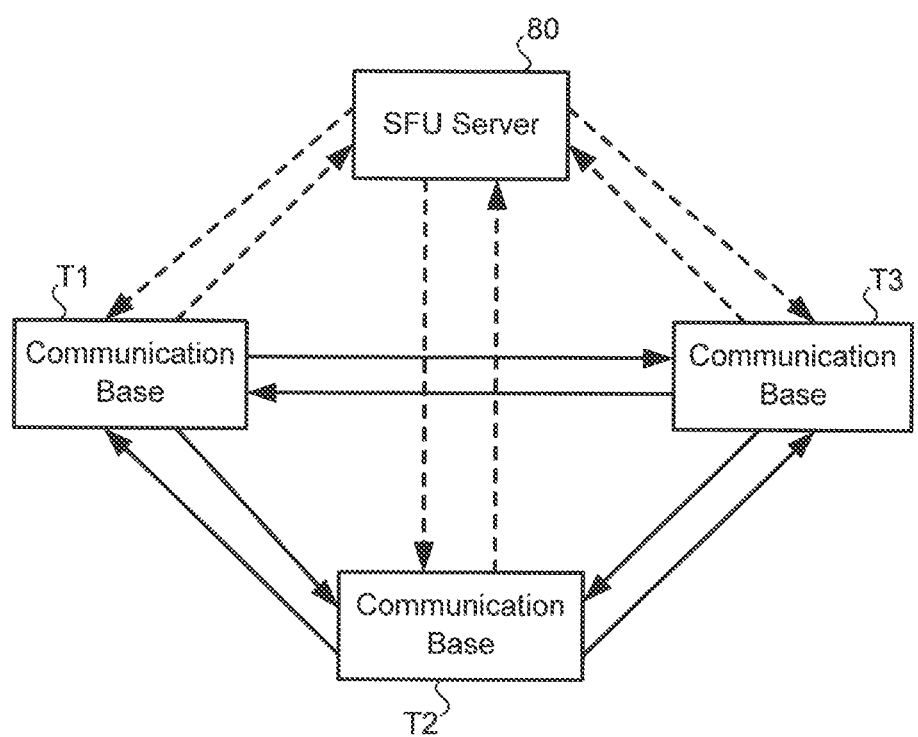
FIG. 8 is a diagram for explaining a data flow between communication bases.

FIG. 8 is a diagram for explaining a data flow between the respective communication bases. When the performance is not played at any communication bases, the state in which the communication mode is set as the mode A is maintained. In this case, all of the sound control data Dc, the sound data Da and the video data Dv are transmitted/received between the communication bases via the SFU server 80 (paths indicated by dotted lines in FIG. 8). That is, the client-server communication is applied to all data. In this situation, since the communication delay is large, but the ensemble is not played, there is no particular problem, and therefore it is prioritized to reduce the communication load and the processing load.

It is assumed that a performance is played at the communication base T1. In this state, the communication mode remains the mode A. At this time, when the performance is further played in the communication base T2, the ensemble state is detected. As a result, the communication mode is switched to the mode D. Therefore, all of the sound control data Dc, the sound data Da, and the video data Dv are switched to the P2P communication and directly transmitted/received between the communication bases (paths indicated by solid lines in FIG. 8).

Thereafter, when the load value Ld increases, the communication mode is switched to the mode C. Therefore, the sound control data Dc and the sound data Da are maintained to the transmission in the P2P communication, and only the video data Dv is switched to the transmission via the SFU server 80. When the load value Ld changes, the communication mode is switched depending on the change, and the communication method type of each data is switched.

As the data for reducing the communication delay, the video data Dv has the lowest priority, and the sound control data Dc has the highest priority. Even if the video data Dv is delayed, if the delay of the sound is small, there is no great trouble in playing ensemble. Therefore, when the communication mode is switched from the mode D to the mode C, the transmission of the video data Dv is switched to the client-server communication. Since the size of the sound control data Dc is small, even if the P2P communication is maintained, the sound control data Dc does not easily become a factor for increasing the load. Therefore, in the communication mode other than the mode A, the transmission of the sound control data Dc uses the P2P communication.

When the performance is interrupted at at least one of the communication bases T1 and T2, the non-ensemble state is detected. As a result, the communication mode is switched to the mode A, that is the client-server communication, and all of the sound control data Dc, the sound data Da, and the video data Dv are transmitted between the communication bases via the SFU server 80.

[7. Synchronization Between Each Data]

Next, a method of synchronizing the sound output from the sound emitting device 60 and the video displayed on the display device 70 at the communication base that has received the sound control data Dc, the sound data Da, and the video data Dv will be described. The synchronization here indicates that the temporal relation of each piece of data on the data transmission side is maintained even on the data reception side. The following description assumes that the data transmission side is the communication base T1, and the data reception side is the communication base T2.

Figure 9:
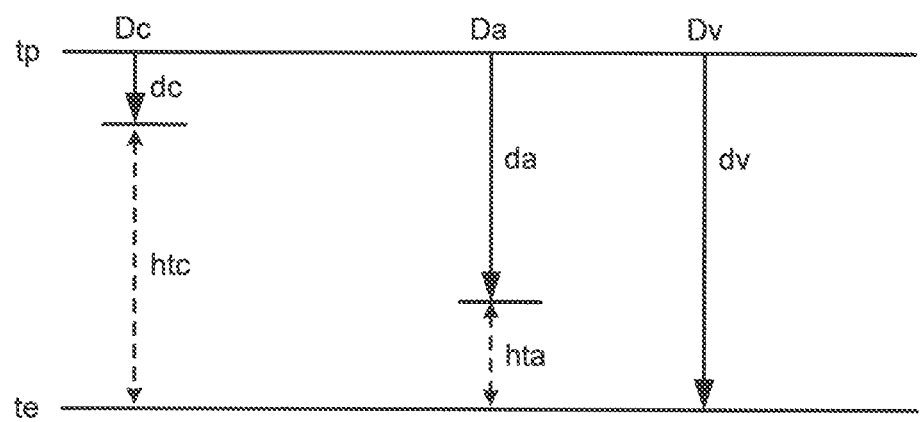
FIG. 9 is a diagram for explaining a method of synchronizing each data.

FIG. 9 is a diagram for explaining a method of synchronizing each data. In FIG. 9, time point tp indicates the timing at which a specific portion of each data is transmitted from the communication base T1, time point to indicates the timing at which the data received at the communication base T2 is synchronously output.

Time interval dc is a time interval corresponding to the communication delay of the sound control data Dc. Therefore, the communication base T2 receives the sound control data Dc after the lapse of the time interval dc from the time point tp. Time interval da is a time interval corresponding to the communication delay of the sound data Da. Therefore, the communication base T2 receives the sound data Da after the lapse of the time interval da from the time point tp. Time interval dv is the time corresponding to the communication delay of the video data Dv. Therefore, the communication base T2 receives the video data Dv after the lapse of the time interval dv from the time point tp.

In this example, in order to synchronize with the video data Dv having the largest communication delay, the time point to corresponds to the reception time point of the video data Dv. Therefore, at the communication base T2, the communication terminal 20 supplies the sound control data Dc to the electrical instrument 30 after the lapse of time interval htc (=time interval dv−time interval dc) from the reception of the sound control data Dc. The sound control data Dc is buffered in the communication terminal 20 until the lapse of the time interval htc. The electrical instrument 30 converts the sound control data Dc into the sound data Da by the sound source and supplies the sound data Da to the sound emitting device 60. As a result, a sound corresponding to the sound control data Dc is output from the sound emitting device 60.

At the communication base T2, the communication terminal 20 supplies the sound data Da to the sound emitting device 60 after the lapse of time interval hta (=time interval dv−time interval da) from the reception of the sound data Da. The sound data Da is buffered in the communication terminal 20 until the lapse of the time interval hta. As a result, a sound corresponding to the sound data Da is output from the sound emitting device 60. At the communication base T2, when the communication terminal 20 receives the video data Dv, the communication terminal 20 supplies the video data Dv to the display device 70. As a result, an image corresponding to the video data Dv is displayed on the display device 70. In this way, the sound corresponding to the sound control data Dc, the sound corresponding to the sound data Da, and the image corresponding to the video data Dv are synchronized.

In the relation of respective communication bases (in the example of FIG. 9, the relation from the communication base T1 to the communication base T2), the time interval htc and the time interval hta may be previously acquired by a known technique, or may be acquired from the time deviation of time stamp sequentially acquired by the time stamp corresponding to the transmission time point given to each piece of data.

The time interval htc and the time interval hta may be acquired by other methods. For example, at the communication base T1, a specific operation by a performer is captured, and a specific sound is recorded simultaneously with the specific operation. The obtained sound data Da and the video data Dv may be received at the communication base T2, and the time interval hta may be acquired based on the deviation between the specific operation and the specific sound. At the communication base T1, the sound control data Dc and the sound data Da are obtained by playing the electrical instrument 30. The sound control data Dc and the sound data Da may be received at the communication base T2, and the time interval htc may be acquired based on the deviation between the note on included in the sound control data Dc and the sound generation start timing of the sound data Da, which corresponds to time interval htx shown in FIG. 10, and the time interval hta.

In the case where the video data Dv is greatly delayed, particularly in the case where the communication mode is the mode C, the video data Dv may be excluded from the target of synchronization.

Figure 10:
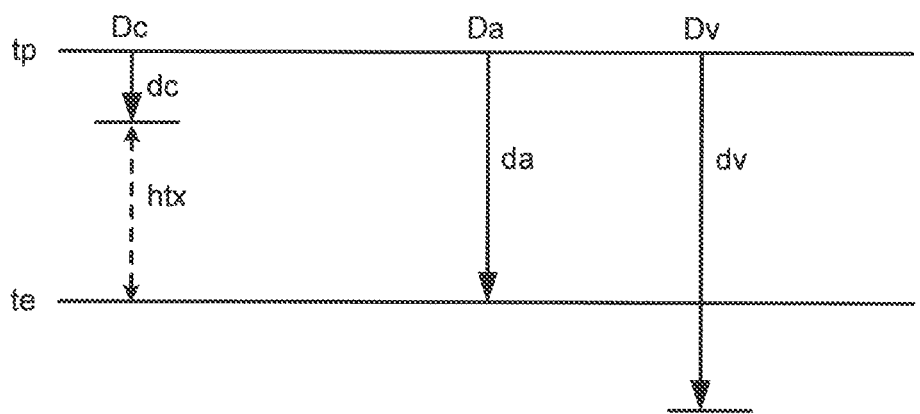
FIG. 10 is a diagram for explaining a method of synchronizing each data when video data Dv is not synchronized.

FIG. 10 is a diagram for explaining a method of synchronizing each data when the video data Dv is not synchronized. Unlike the example shown in FIG. 9, the communication base T2 receives the video data Dv transmitted at the time point tp after the time point te. In this example, in order to synchronize with the sound data Da having the largest communication delay among the data to be synchronized, the time point te corresponds to the reception time point of the sound data Da. Therefore, at the communication base T2, the communication terminal 20 supplies the sound control data Dc to the electrical instrument 30 after the lapse of time interval htx (=time interval da−time interval dc) from the reception of the sound control data Dc. The electrical instrument 30 converts the sound control data Dc into the sound data Da by the sound source and supplies the sound data Da to the sound emitting device 60. As a result, a sound corresponding to the sound control data Dc is output from the sound emitting device 60.

In the communication base T2, when the communication terminal 20 receives the sound data Da, the communication terminal 20 supplies the sound data Da to the sound emitting device 60. As a result, a sound corresponding to the sound data Da is output from the sound emitting device 60. In this way, the sound corresponding to the sound control data Dc and the sound corresponding to the sound data Da are synchronized. On the other hand, the video data Dv is not synchronized with these data.

Next, it is assumed that the electrical instrument 30 at the communication base T2 has a driving unit for driving the performance operating element in accordance with the sound control data Dc. In this case, it takes a driving time from the supply of the sound control data Dc to the electrical instrument 30 to the driving of the performance operating element. Each data may be synchronized in consideration of the driving time. In such synchronization, it is set as a specific mode.

Figure 11:
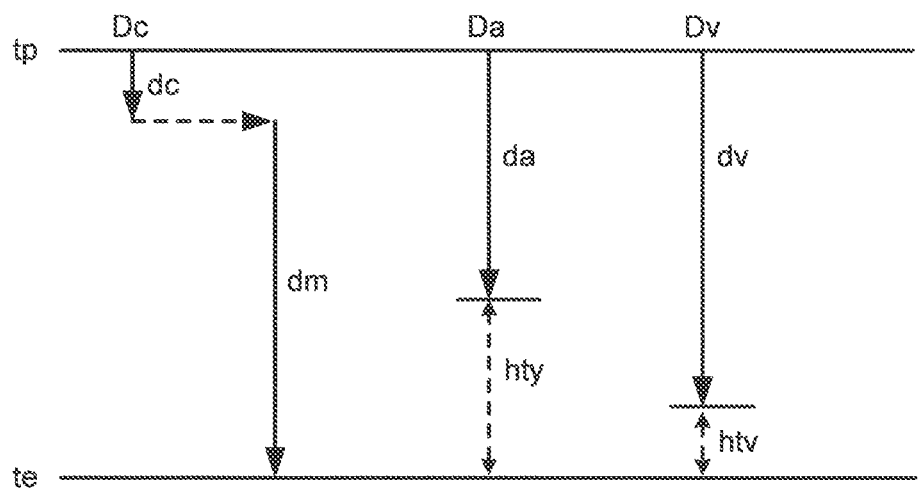
FIG. 11 is a diagram for explaining a method of synchronizing each data in a specific mode.

FIG. 11 is a diagram for explaining a method of synchronizing each data in the specific mode. Time interval dm shown in FIG. 11 corresponds to the driving time required from the supply of the sound control data Dc to the driving of the performance operating element. The time interval dm may be preset as a characteristic of driving unit of the electrical instrument 30, or the time interval dm may be measured in advance.

In this example, the time interval required for the sound control data Dc to output the sound data Da in the electrical instrument 30 is the largest. Therefore, the time point to corresponds to the timing when the sound data Da is output from the electrical instrument 30 in which the performance operating element is driven in accordance with the sound control data Dc. As a result, in the communication base T2, the communication terminal 20 supplies the sound data Da to the sound emitting device 60 after the lapse of time interval hty (=time interval dc+time interval dm−time interval da) after the reception of the sound data Da. As a result, a sound corresponding to the sound data Da is output from the sound emitting device 60.

At the communication base T2, the communication terminal 20 supplies the video data Dv to the display device 70 after the lapse of time interval htv (=time interval dc+time interval dm−time interval dv) after the reception of the video data Dv. As a result, an image corresponding to the video data Dv is displayed on the display device 70. In this way, the sound corresponding to the sound control data Dc, the sound corresponding to the sound data Da, and the image corresponding to the video data Dv are synchronized.

When the time interval until the sound data Da is output by the electrical instrument 30 by the sound control data Dc is the largest, that is, when the time interval dm is large, the transmission of the sound data Da and the video data Dv may not be performed in the P2P communication depending on the time interval da and the time interval dv. For example, even if the sound data Da and the video data Dv are transmitted from the communication base T1 in the client-server communication, when the sound data Da and the video data Dv are received at the communication base T2 before the time point te, it is not necessary to transmit the sound data Da and the video data Dv in the P2P communication. Therefore, in this case, when the communication mode may be the modes C and D, the communication mode may be set as the mode B.

As described above, in the communication system according to an embodiment, the communication method type can be switched depending on the status between the plurality of communication bases. Accordingly, it is also possible to control the communication by applying a communication method type that reduces the communication delay when the performances at the plurality of communication bases are in the ensemble state and by applying a communication method type that reduces the communication load and the processing load when the performances are in the non-ensemble state. When the communication load or the processing load becomes large, the communication method type can be controlled for each type of data.

<Modifications>

While an embodiment of the present disclosure has been described above, an embodiment of the present disclosure may also be modified into various forms as follows. The above embodiments and the modifications described below can be applied in combination with each other.

(1) The communication management server 1 may have the function of the SFU server 80. In this case, the communication management server 1 may use the data transmitted in the client-server communication instead of the feature value information to detect the ensemble state.

(2) The switching signal transmitted from the communication management server 1 to the communication terminal 20 is a signal for switching the communication mode, but instead of specifying the communication mode after the switching, it may be a signal for specifying the communication method type of the respective data. In this case, the signal may be a format to specify data requiring a change in the communication method type. Thus, the communication terminal 20 may not have the communication control table.

(3) The timing at which the P2P communication connecting the respective communication bases is established may be the timing at which the P2P communication is required in accordance with the communication mode or may be the timing before the detection of the ensemble state is started. When there is no data to be transmitted in the P2P communication, the establishment of the P2P communication may be canceled.

(4) When the communication method type is switched, the communication terminal 20 may receive the data in the communication method type before switching and then may output the data buffered by the communication terminal 20 to the electrical instrument 30, the sound emitting device 60, and the display device 70 until the data is received in the communication method type after the switching.

(5) In the embodiment, since the communication base T1 and the communication base T2 ensembles, it is detected that the session room is in the ensemble state, and the processing different from the set communication mode may be executed with respect to the communication base T3 that is not a comparison target at the time of detection. For example, since the data transmitted from the communication base T3 does not need to reduce the communication delay, the client-server communication may be used.

(6) The communication mode may be only the modes A and D. In this case, the processing of switching the communication mode depending on the communication load and the processing load is unnecessary.

(7) The video data Dv may be transmitted in the client-server communication in all communication method types and may be excluded from the communication control target of streaming data.

(8) When the communication load and the processing load exceed predetermined values, the communication terminal 20 may execute a processing for reducing these loads. The communication terminal 20 may reduce loads by, for example, a processing to reduce the video size, a processing to reduce the video resolution, a processing to lower the video frame frequency, a processing to lower the sound sampling frequency, a processing to increase the compressibility, and a processing to reduce the audio channels (a processing to change stereo to monaural). In these processing, the adjustment range is determined in advance. In the case of performing the processing for reducing the load in this way, the above-described load value Ld does not increase until the adjustment within the adjustment range becomes impossible.

(9) The ensemble state may be detected by comparing the video data Dv. In this case, the feature value information includes a feature value related to the video data Dv. The feature value may be, for example, information indicating whether the musical instrument is included in the image as a result of analyzing the image indicated by the video data Dv or may be information indicating whether a moving person is included in the image. The ensemble state may be detected by using a period in which the musical instrument is included in the image or a period in which the moving person is included in the image, instead of the sound period in the embodiment. As described above, if the communication method type between the communication bases is controlled depending on the status of respective communication bases, various methods can be applied to detect the status of respective communication bases.

Even in this case, as in the above-described modification (7), the video data Dv may be excluded from the communication control target of streaming data. As described above, the streaming data for detecting the status of respective communication bases such as the detection of the ensemble state and the communication control target of streaming data may not have to match.

The ensemble state may be detected by combining the comparison of the feature value related to the image according to the present modification and the comparison of the feature value related to the sounds according to the embodiment. When used in combination, the ensemble state may be detected when any one of the conditions is satisfied, or the ensemble state may be detected when both of the conditions are satisfied.

(10) When a performance using the electrical instrument 30 is played, one of the sound control data Dc and the sound data Da output from the electrical instrument 30 may be transmitted from the communication terminal 20. For example, when a performance using the electrical instrument 30 is played at the communication base T1, and the communication bases T2 and T3 have a function of converting the sound control data Dc into the sound data Da (for example, when the electrical instrument 30 is provided), the communication terminal 20 at the communication base T1 does not transmit the sound data Da generated by the electrical instrument 30. On the other hand, when the communication bases T2 and T3 do not have the function of converting the sound control data Dc into the sound data Da, the communication terminal 20 at the communication base T1 does not transmit the sound control data Dc generated by the electrical instrument 30. Information whether the communication bases T2 and T3 have the function of converting the sound control data Dc to sound data Da may be transmitted in advance from respective communication bases to the communication management server 1. In this way, unnecessary streaming data is not transmitted from any communication bases.

(11) Although the ensemble state is detected based on the relation between the sound periods at respective communication bases, the ensemble state may be detected based on the correlation between sounds rather than the sound periods. In this case, it may be determined whether sounds at the plurality of communication bases have a predetermined correlation in each of the sections W1 to W5. The feature value may be any information necessary for obtaining the correlation or may be any information related to sounds. For example, it may be a BPM (Beats Per Minute) in which the feature value as information related to sounds is calculated based on the strength of the sound. In this case, when the BPM at respective communication bases has an error of 10% or less in the sections W1 to W5, the ensemble state may be detected.

When a situation in which a performance of the same content is played at the plurality of communication bases is assumed, the sound wave signal in the sound data Da transmitted from the plurality of communication bases may be compared and the degree of matching of the sound wave signals may be acquired as a correlation. Therefore, the feature value as the information related to sound is the sound wave signal. Considering the communication delay, the degree of matching of the sound wave signals is calculated while changing the temporal relative position of both signals within a predetermined range, and the value when the degree of matching is the largest is adopted as the degree of matching. When the degree of matching is greater than a predetermined value, the ensemble state may be detected.

As another example of method for considering the communication delay, the communication management server 1 may acquire the communication delay time when the sound data Da is received from respective communication bases, and may adjust the temporal position of the sound data Da from the communication base to the timing when the sound data Da is transmitted from the communication base depending on the communication delay time. In this way, by adjusting the temporal position of the sound data Da corresponding to respective communication bases, the sound data Da based on the time point received by the communication management server 1 can be converted into the sound data Da based on the time point transmitted from the communication base.

By comparing the sound wave signal using the converted sound data Da, the degree of matching of the sound wave signals may be calculated. This makes it possible to reduce the influence of the communication delay time. Depending on the accuracy of the communication delay time to be acquired, using the above method together, the degree of matching of the sound wave signals may be calculated while changing the temporal position in a predetermined range with respect to both signals based on the converted sound data Da.

In addition, for example, musical analysis elements such as pitches, volumes, timbres, playing methods, and chords may be used as the feature value as the information related to sounds. The ensemble state is not limited to the case where the same type of elements are compared and detected but may also be the case where different types of elements are compared and detected. For example, by comparing the chord and the pitch, it is possible to use the pitch having high harmony with the constituent sound of the chord as a condition for detecting the ensemble state.

For example, a chord is used as the feature value in a musical instrument that can simultaneously produce a plurality of sounds such as chords at the same time (for example, a keyboard instrument such as a piano, or a stringed instrument such as a guitar). On the other hand, a pitch is used as the feature value in a musical instrument that produces a single sound (for example, a stringed musical instrument such as a violin, or a wind instrument such as a sax or a trumpet). By comparing the chord with the pitch, the ensemble state of both instruments may be detected. Instead of a musical instrument, a human voice may be used as a comparison target in the detection of the ensemble state. A single voice corresponds to a musical instrument that produces a single sound, and a plurality of voices corresponds to a musical instrument that can simultaneously produce a plurality of sounds.

In the case of using a pitch, for example, changes in the pitch over time, i.e., a phrase, may be used to detect the ensemble state. At this time, in two phrases to be compared, the ensemble state may be detected on the condition that the ratio of the pitches to be the same is equal to or greater than a predetermined ratio.

(12) The communication method type in which each data is transmitted is not limited to the case where either P2P communication or client-server communication is selected, but may be selected from various combinations if it is a combination of communication method types having different communication delays.

(13) The detection of ensemble state may be performed in the communication terminal 20 at any communication bases, not only when it is performed in the communication management server 1. In this case, the communication terminal 20 detects the ensemble state based on the comparison of the data transmitted from another communication base. When the communication terminal 20 detects the ensemble state as a result of the comparison, the communication terminal 20 can transmit the result of detecting the ensemble state to the communication management server 1.

The above description relates to modifications.

A method of controlling communication including obtaining a result of comparison between a first feature value of first streaming data and a second feature value of second streaming data, the first streaming data having been transmitted from a first terminal using a first communication method type, the second streaming data having been transmitted from a second terminal using the first communication method type, the first communication method type being used by the first terminal and the second terminal to transmit streaming data between the first terminal and the second terminal, and transmitting a first switching signal that causes the first terminal and the second terminal to switch from using the first communication method type to using a second communication method type to transmit streaming data between the first terminal and the second terminal in a case where the first feature value and the second feature value have a first relation according to the comparison result, the second communication method type being different from the first communication method type is provided. The method can also be configured as follows.

In the method of controlling communication, the first feature value and the second feature value include information defining a sound period, the first feature value and the second feature value have the first relation in a case where a first sound period defined by the first feature value and a second sound period defined by the second feature value both exist in each of a predetermined number of determination periods.

In the method of controlling communication, the first feature value and the second feature value include information related to sounds, the first feature value and the second feature value have the first relation in a case where a predetermined correlation between the first feature value and the second feature value exists.

In the method of controlling communication, the information related to sounds is a sound wave signal, and the predetermined correlation between the first feature value and the second feature value exists in a case where a degree of matching between a first sound wave signal corresponding to the first feature value and a second sound wave signal obtained while changing a temporal relative position of the first sound wave signal and the second sound wave signal within a predetermined range is greater than a predetermined value.

In the method of controlling communication, the information related to sounds is a sound wave signal, and the predetermined correlation between the first feature value and the second feature value exists in a case where a degree of matching obtained from a first sound wave signal corresponding to the first feature value and a second sound wave signal corresponding to the second feature value is greater than a predetermined value, a temporal relative position of the first feature value being adjusted based on a first communication delay time from the first terminal, and a temporal relative position of the second feature value being adjusted based on a second communication delay time from the second terminal.

In the method of controlling communication, a communication delay of the second communication method type is smaller than a communication delay of the first communication method type.

In the method of controlling communication, the first terminal and the second terminal are caused to communicate with each other through a server in the first communication method type, and the first terminal and the second terminal are caused to communicate with each other by Peer-to-Peer Communication (P2P) in the second communication method type.

In the method of controlling communication, the first switching signal causes the first terminal to transmit the first streaming data including sound control data to the second terminal using the second communication method type and to continue to transmit third streaming data including sound wave signal data to the second terminal using the first communication method type in the case where the first feature value and the second feature value have the first relation and the first communication method type is being used by the first terminal to transmit the first streaming data and third streaming data to the second terminal.

In the method of controlling communication, the method further includes transmitting, in a case where (a) the second communication method type is being used by the first terminal to transmit the first streaming data including sound control data and third streaming data including sound wave signal data to the second terminal and (b) a communication load of the first terminal or the second terminal satisfies a predetermined condition, a second switching signal that causes the first terminal (i) to switch from using the second communication method type to transmit the third streaming data to using the first communication method type to transmit the third streaming data and (ii) to continue to transmit the first streaming data using the second communication method type.

In the method of controlling communication, the method further includes transmitting, in a case where (a) the second communication method type is being used by the first terminal to transmit the first streaming data including sound control data and third streaming data including sound wave signal data to the second terminal and (b) a processing load of the first terminal or the second terminal satisfies a predetermined condition, a second switching signal that causes the first terminal (i) to switch from using the second communication method type to transmit the third streaming data to using the first communication method type to transmit the third streaming data and (ii) to continue to transmit the first streaming data to using the second communication method type.

In the method of controlling communication, the method further includes transmitting a second switching signal that causes the first terminal and the second terminal to switch from using the second communication method type to using the first communication method type to transmit streaming data between the first terminal and the second terminal in the case where the first feature value and the second feature value have a second relation different from the first relation after the first feature value and the second feature value had the first relation based on the comparison result.

In the method of controlling communication, the second switching signal further causes the first terminal and the second terminal to cancel communication establishment by the second communication method type.

In the method of controlling communication, the first switching signal further causes a third terminal to switch from using the first communication method type to using the second communication method type to transmit streaming data between the first terminal, the second terminal, and the third terminal in the case where the first feature value and the second feature value have the first relation according to the comparison result.

What is claimed is:

1. A method of controlling communication, the method comprising:
   obtaining a result of comparison between a first feature value of first streaming data and a second feature value of second streaming data, the first streaming data having been transmitted from a first terminal using a first communication method type, the second streaming data having been transmitted from a second terminal using the first communication method type, the first communication method type being used by the first terminal and the second terminal to transmit streaming data between the first terminal and the second terminal; and
   transmitting a first switching signal that causes the first terminal and the second terminal to switch from using the first communication method type to using a second communication method type to transmit streaming data between the first terminal and the second terminal in a case where the first feature value and the second feature value have a first relation according to the comparison result, the second communication method type being different from the first communication method type.

2. The method of controlling communication according to claim 1, wherein
   the first feature value and the second feature value include information defining a sound period,
   the first feature value and the second feature value have the first relation in a case where a first sound period defined by the first feature value and a second sound period defined by the second feature value both exist in each of a predetermined number of determination periods.

3. The method of controlling communication according to claim 1, wherein
   the first feature value and the second feature value include information related to sounds,
   the first feature value and the second feature value have the first relation in a case where a predetermined correlation between the first feature value and the second feature value exists.

4. The method of controlling communication according to claim 3, wherein
   the information related to sounds is a sound wave signal, and
   the predetermined correlation between the first feature value and the second feature value exists in a case where a degree of matching between a first sound wave signal corresponding to the first feature value and a second sound wave signal corresponding to the second feature value, obtained while changing a temporal relative position of the first sound wave signal and the second sound wave signal within a predetermined range is greater than a predetermined value.

5. The method of controlling communication according to claim 3, wherein
   the information related to sounds is a sound wave signal, and
   the predetermined correlation between the first feature value and the second feature value exists in a case where a degree of matching obtained from a first sound wave signal corresponding to the first feature value and a second sound wave signal corresponding to the second feature value is greater than a predetermined value, a temporal relative position of the first feature value being adjusted based on a first communication delay time from the first terminal, and a temporal relative position of the second feature value being adjusted based on a second communication delay time from the second terminal.

6. The method of controlling communication according to claim 1, wherein
   a communication delay of the second communication method type is smaller than a communication delay of the first communication method type.

7. The method of controlling communication according to claim 1, wherein
   the first terminal and the second terminal are caused to communicate with each other through a server in the first communication method type, and
   the first terminal and the second terminal are caused to communicate with each other by Peer-to-Peer Communication (P2P) in the second communication method type.

8. The method of controlling communication according to claim 1, wherein
   the first switching signal causes the first terminal to transmit the first streaming data including sound control data to the second terminal using the second communication method type and to continue to transmit third streaming data including sound wave signal data to the second terminal using the first communication method type in the case where the first feature value and the second feature value have the first relation and the first communication method type is being used by the first terminal to transmit the first streaming data and third streaming data to the second terminal.

9. The method of controlling communication according to claim 1,
   the method further comprising:
   transmitting, in a case where (a) the second communication method type is being used by the first terminal to transmit the first streaming data including sound control data and third streaming data including sound wave signal data to the second terminal and (b) a communication load of the first terminal or the second terminal satisfies a predetermined condition, a second switching signal that causes the first terminal (i) to switch from using the second communication method type to transmit the third streaming data to using the first communication method type to transmit the third streaming data and (ii) to continue to transmit the first streaming data using the second communication method type.

10. The method of controlling communication according to claim 1,
the method further comprising:
transmitting, in a case where (a) the second communication method type is being used by the first terminal to transmit the first streaming data including sound control data and third streaming data including sound wave signal data to the second terminal and (b) a processing load of the first terminal or the second terminal satisfies a predetermined condition, a second switching signal that causes the first terminal (i) to switch from using the second communication method type to transmit the third streaming data to using the first communication method type to transmit the third streaming data and (ii) to continue to transmit the first streaming data to using the second communication method type.

11. The method of controlling communication according to claim 1, the method further comprising:
transmitting a second switching signal that causes the first terminal and the second terminal to switch from using the second communication method type to using the first communication method type to transmit streaming data between the first terminal and the second terminal in the case where the first feature value and the second feature value have a second relation different from the first relation after the first feature value and the second feature value had the first relation based on the comparison result.

12. The method of controlling communication according to claim 11, wherein
the second switching signal further causes the first terminal and the second terminal to cancel communication establishment by the second communication method type.

13. The method of controlling communication according to claim 1, wherein
the first switching signal further causes a third terminal to switch from using the first communication method type to using the second communication method type to transmit streaming data between the first terminal, the second terminal, and the third terminal in the case where the first feature value and the second feature value have the first relation according to the comparison result.

14. A communication control device, the device comprising:
a memory storing instructions; and
a processor that implements the instructions to:
obtain a result of comparison between a first feature value of first streaming data and a second feature value of second streaming data, the first streaming data having been transmitted from a first terminal using a first communication method type, the second streaming data having been transmitted from a first terminal using the second communication method type, the first communication method type being used by the first terminal and the second terminal to transmit streaming data between the first terminal and the second terminal; and transmit a first switching signal that causes the first terminal and the second terminal to switch from using the first communication method type to using a second communication method type to transmit streaming data between the first terminal and the second terminal in a case where the first feature value and the second feature value have a first relation according to the comparison result, the second communication method type being different from the first communication method type.

15. The device according to claim 14, wherein
the first feature value and the second feature value include information defining a sound period,
the first feature value and the second feature value have the first relation in a case where a first sound period defined by the first feature value and a second sound period defined by the second feature value both exist in each of a predetermined number of determination periods.

16. The device according to claim 14, wherein
the first feature value and the second feature value include information related to sounds,
the first feature value and the second feature value have the first relation in a case where a predetermined correlation between the first feature value and the second feature value exists.

17. The device according to claim 16, wherein
the information related to sounds is a sound wave signal,
the predetermined correlation between the first feature value and the second feature value exists in a case where a degree of matching between a first sound wave signal corresponding to the first feature value and a second sound wave signal corresponding to the second feature value, obtained while changing a temporal relative position of the first sound wave signal and the second sound wave signal within a predetermined range is greater than a predetermined value.

18. The device according to claim 16, wherein
the information related to sounds is a sound wave signal,
the predetermined correlation between the first feature value and the second feature value exists in a case where a degree of matching obtained from a first sound wave signal corresponding to the first feature value and a second sound wave signal corresponding to the second feature value is greater than a predetermined value, a temporal relative position of the first feature value being adjusted based on a first communication delay time from the first terminal, and a temporal relative position of the second feature value being adjusted based on a second communication delay time from the second terminal.

19. The device according to claim 14, wherein
a communication delay of the second communication method type is smaller than a communication delay of the first communication method type.

20. The device according to claim 14, wherein
the first terminal and the second terminal are caused to communicate with each other through a server in the first communication method type, and
the first terminal and the second terminal are caused to communicate with each other by Peer-to-Peer Communication (P2P) in the second communication method type.

21. The device according to claim 14, wherein
the first switching signal causes the first terminal to transmit the first streaming data including sound control data to the second terminal using the second communication method type and to continue to transmit third streaming data including sound wave signal data to the second terminal using the first communication method type in the case where the first feature value and the second feature value have the first relation and the first communication method type is being used by the first terminal to transmit the first streaming data and third streaming data to the second terminal.

* * * * *